UNITED STATES PATENT OFFICE.

HENRY C. BAUM, OF DENVER, COLORADO, ASSIGNOR OF ONE-HALF TO JOHN H. FERGUSON, OF SAME PLACE.

PROCESS OF MANUFACTURING PORTLAND CEMENT.

SPECIFICATION forming part of Letters Patent No. 446,911, dated February 24, 1891.

Application filed June 2, 1890. Serial No. 354,019. (No specimens.)

*To all whom it may concern:*

Be it known that I, HENRY C. BAUM, a citizen of the United States, residing at Denver, in the county of Arapahoe and State of Colorado, have invented certain new and useful Improvements in Processes for Manufacturing Portland Cement; and I do declare the following to be a full, clear, and exact description of the invention, such as will enable others skilled in the art to which it appertains to make and use the same.

My invention relates to improvements in the process of manufacturing Portland cement; and the objects of my improvements are, first, to greatly diminish the cost of making the cement as compared with the process heretofore employed, and, second, to make a better quality of cement than can be produced by the old process.

The prominent materials used in the manufacturing of the so-called "Portland" cement are calcareous marl and limestone or chalk. The custom heretofore has been to combine these articles by the aid of water and suitable machinery, and to accomplish this it is first necessary to grind the limestone or chalk into a powder and then mix the same with the marl, forming a paste of a consistency adapting it to be formed into brick or lumps for drying and burning. The custom of drying the aforesaid mixture after it has been made into bricks and preparatory to burning has been to expose the bricks to the sun's rays or subject them to the action of artificial heat. This is an expensive and slow process, and, moreover, said method will not allow or give an intimate or perfect admixture of the materials used. I propose to overcome this defect and to combine the materials employed in such a manner as to render the resulting mass perfectly homogeneous, the essential feature in the manufacture of cement. This I accomplish by grinding the marl and the necessary amount of lime together by the use of suitable machinery; but in order to grind the marl it must be absolutely free from any moisture. To drive off this moisture by the use of artificial heat produced in the ordinary way for the purpose of drying is wasteful, slow, and expensive.

The essential point in my invention, and which so far as I know is entirely novel and original with me, consists in extracting the water from the marl by means of quicklime (CaO.) The lime is added to the marl in the proportions necessary for the manufacture of the Portland cement, when the following reaction takes place: By adding the quicklime (CaO) to the wet calcareous marl the water in the marl forms a chemical union with the lime, (CaO,) forming a hydrate of lime $Ca(OH)_2$. By this process of hydration of the lime the water is entirely extracted from the marl, leaving the mixture thoroughly dry and in a condition to be ground to the finest powder by any suitable means, after which it can be moistened with the necessary amount of water conveyed directly to the dry-press machine and molded into bricks suitable for the kilns.

It will be observed that by the use of my improved process I accomplish the following results: first, by combining the quicklime (CaO) and the calcareous marl the latter is thoroughly dried by the attendant chemical reaction, leaving the mixture in a condition capable of being ground to an impalpable powder by any suitable machinery, a result that has not been attained by the process now in use; second, I obviate the necessity of drying the bricks made from the mixture in drying-chambers or in any other manner preparatory to burning.

Having thus described my invention, what I claim is—

In the manufacture of Portland cement, the process of uniting the wet marl with quicklime, (CaO,) whereby the mixture through the resulting chemical reaction is rendered perfectly dry preparatory to grinding, substantially as described.

In testimony whereof I affix my signature in presence of two witnesses.

HENRY C. BAUM.

Witnesses:
JOSEPH GUTSHALL,
WM. McCONNELL.